United States Patent Office 3,160,633
Patented Dec. 8, 1964

3,160,633
SYNTHESIS OF PYRIDINE ALDEHYDES
Francis E. Cislak, Indianapolis, Ind., assignor to Reilly Tar & Chemical Corporation, Indianapolis, Ind., a corporation of Indiana
No Drawing. Filed Dec. 6, 1962, Ser. No. 242,647
11 Claims. (Cl. 260—297)

My invention relates to a chemical process. More particularly, it relates to a process of preparing pyridine aldehydes.

Pyridine aldehydes are well-known organic compounds. They are important in the synthesis of a wide variety of organic compounds, especially those of interest in the medicinal field.

The preparation of pyridine aldehydes on a laboratory scale can be accomplished in several ways. The oxidation of pyridyl carbinols with $MnO_2$ is quite useful [Heiner et al., J. Am. Chem. Soc., 81, 3933–43 (1959)]. 2- and 4-pyridine aldehydes may be prepared by heating their —N-oxides with acetic anhydride [Boekelheide et al., J. Am. Chem. Soc., 76, 1286–91 (1954)]. 3-pyridine aldehyde has been made by the interaction of 3-aminomethylpyridine with hexamethylene tetramine [Angyl et al., J. Chem. Soc., 1953, 1740–1]. 3-pyridine aldehyde has been made by reacting 3-cyanopyridine with

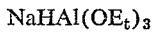
$NaHAl(OEt)_3$ made from sodium hydride and aluminum ethylate [Hesse et al., Chem Abstr., 51, 11341 (1957)].

I have found that I can economically prepare pyridyl aldehydes from the readily available formic acid.

In carrying out my invention I prepare a gaseous mixture of a cyanopyridine, formic acid, and water. This mixture of vapors is passed through a suitable reactor containing a catalyst. The temperature of the reactor is maintained between about 250° C. and 650° C. and preferably between about 400° C. and 500° C. I prefer to conduct my process in a continuous manner although that is not necessary.

The reactor used may be of various types. I prefer the type normally used in carrying out cracking operations in the petroleum industry. Such reactors are of tubular form with suitable connections at entrance and exit. They are provided with means for supporting the bed of catalyst, and are provided with any convenient means for heating them.

The catalyst used may be any of a large number of catalysts which are useful in the preparation of ketones from alkyl carboxylic acids. These catalysts comprise compounds of elements of Groups II and III of the periodic table having an atomic number between 12 and 58 inclusive, compounds of metallic elements of Group IV, compounds of elements of Series 4 of the periodic table having an atomic number between 23 and 28 inclusive, and mixtures thereof.

A satisfactory way of carrying out my invention is as follows. The parts are by weight.

EXAMPLE 1

3-Pyridine Aldehyde

I prepare a gaseous mixture composed of 100 parts of 3-cyanopyridine, 55 parts of water, and 100 parts of formic acid. I pass the mixture of vapors through a reactor containing a catalytic bed of thoria-alumina catalyst (10% $ThO_2$ on alumina). The temperature of the reactor is maintained at about 425° C. As the vapors of 3-cyanopyridine, water, and formic acid pass through the reactor, a reaction occurs whereby 3-pyridine aldehyde (3-formylpyridine) is formed. The vapors of the unchanged reactants and the reaction products are condensed as they emerge from the reactor, and the condensate is collected in a suitable receiver. The crude condensate is fractionally distilled under high vacuum to separate the 3-pyridine aldehyde.

In place of the thoria-alumina catalyst, I may use a large number of other catalysts. Among the catalysts I have found useful in carrying out my reaction are the catalysts which are useful in the preparation of ketones by the decomposition of aliphatic carboxylic acids. Such catalysts include, in addition to the thoria-alumina, uranium dioxide, manganese oxide, alumina, alkaline earth oxides, lead salts, copper, coke zinc oxide, chromium oxide, vanadium oxide, thorium oxide, silica-alumina, and the like.

My invention does not reside in the discovery of a new catalyst. What I have discovered is that the interaction of a cyanopyridine and formic acid in the presence of water vapor yields pyridine aldehydes in good yields.

In Example 1 the molecular equivalents of the reactants used are 3-cyanopyridine one mol, water three mols, and formic acid two mols. I need not, however, use the specific molal ratios of Example 1. The proportions of the reactants may be varied widely. In general, I prefer to use an excess of water and formic acid. And I prefer to use a molal excess of water over the formic acid, but that is not necessary; I need not add water to my reaction mixture as it can be formed by the decomposition of formic acid itself.

The temperature at which my reaction may be conducted may be varied widely. In general, I prefer to have the reaction temperatures above about 400° C. and below about 550° C. More desirably, I prefer that the reaction temperatures should be between about 425° C. and 500° C.

EXAMPLE 2

4-Pyridine Aldehyde

The procedure of Example 1 is repeated with the exception that 4-cyanopyridine is used in place of the 3-cyanopyridine and 4-pyridine aldehyde is recovered.

EXAMPLE 3

3,5-Diformylpyridine

The procedure of Example 1 is repeated with the exception that I use 50 parts of 3,5-dicyanopyridine in place of the 100 parts of 3-cyanopyridine, and I recover 3,5-diformylpyridine.

EXAMPLE 4

3-Methyl-5-Formylpyridine

The procedure of Example 1 is repeated with the exception that I use 3-methyl-5-cyanopyridine in place of the 3-cyanopyridine, and I recover 3-methyl-5-formylpyridine.

EXAMPLE 5

2-Pyridine Aldehyde

The procedure of Example 1 is repeated with the exception that I use 2-cyanopyridine in place of the 3-cyanopyridine, and I recover 2-pyridine aldehyde.

EXAMPLE 6

3-Ethyl-4-Formylpyridine

The procedure of Example 1 is repeated with the exception that I use 3-ethyl-4-cyanopyridine in place of the 3-cyanopyridine, and I recover 3-ethyl-4-formylpyridine.

This application is a continuation-in-part of my copending application Serial No. 15,259 filed March 6, 1960, now abandoned.

I claim as my invention:

1. The process of preparing pyridine aldehydes which comprises vapor phase interaction of cyanopyridine with water and formic acid in the presence of a catalyst comprising a compound selected from the group consisting of a compound of an element of Groups II and III of the periodic table having an atomic number between 12 and 58 inclusive, a compound of a metallic element of Group IV, a compound of an element of Series 4 of the periodic table having an atomic number between 23 and 28 inclusive, and mixtures thereof maintained at a temperature between about 250° C. and 650° C.

2. The process of preparing pyridine aldehydes which comprises vapor phase interaction of cyanopyridine with water and formic acid in the presence of a catalyst comprising a compound selected from the group consisting of a compound of an element of Groups II and III of the periodic table having an atomic number between 12 and 58 inclusive, a compound of a metallic element of Group IV, a compound of an element of Series 4 of the periodic table having an atomic number between 23 and 28 inclusive, and mixtures thereof maintained at a temperature between about 400° C. and 500° C.

3. The process of claim 2 in which 3-cyanopyridine is used.

4. The process of claim 2 in which 4-cyanopyridine is used.

5. The process of claim 2 in which 2-cyanopyridine is used.

6. The process of claim 2 in which 3,5-dicyanopyridine is used.

7. The process of preparing pyridine aldehydes which comprises vapor phase interaction of cyanopyridine with water and formic acid in the presence of a thoria-alumina catalyst maintained at a temperature between about 400° C. and 500° C.

8. The process of claim 7 in which 3-cyanopyridine is used.

9. The process of claim 7 in which 4-cyanopyridine is used.

10. The process of claim 7 in which 2-cyanopyridine is used.

11. The process of claim 7 in which 3,5-dicyanopyridine is used.

No references cited.